United States Patent

Savoca et al.

[11] Patent Number: 6,051,527
[45] Date of Patent: Apr. 18, 2000

[54] AMINOPROPYLBIS(AMINOETHYL) ETHER COMPOSITIONS FOR THE PRODUCTION OF POLYURETHANES

[75] Inventors: Ann Coates Lescher Savoca, Bernville; Richard Paul Underwood; Richard Van Court Carr, both of Allentown; James Stephen Emerick; Mark Leo Listemann, both of Whitehall, all of Pa.

[73] Assignee: Air Products and Chemicals, Inc., Allentown, Pa.

[21] Appl. No.: 09/251,318

[22] Filed: Feb. 17, 1999

Related U.S. Application Data

[62] Division of application No. 08/534,751, Sep. 27, 1995, Pat. No. 5,874,483.

[51] Int. Cl.$^7$ ...................................... B01J 27/24
[52] U.S. Cl. ..................... 502/167; 502/200; 521/115; 521/116; 521/128; 521/129
[58] Field of Search ...................... 502/167, 200; 521/116, 115, 128, 129

[56] References Cited

U.S. PATENT DOCUMENTS

| | | |
|---|---|---|
| 4,338,408 | 7/1982 | Zimmerman et al. . |
| 4,433,170 | 2/1984 | Zimmerman et al. . |
| 5,229,430 | 7/1993 | Tamano et al. . |
| 5,315,041 | 5/1994 | Abe et al. . |
| 5,508,314 | 4/1996 | Listemann . |
| 5,824,711 | 10/1998 | Kimock et al. ................ 521/129 |

FOREIGN PATENT DOCUMENTS

| | | |
|---|---|---|
| 0102632 | of 0000 | European Pat. Off. . |
| 2102410 | of 0000 | United Kingdom . |

*Primary Examiner*—John M. Cooney, Jr.
*Attorney, Agent, or Firm*—Michael Leach

[57] ABSTRACT

A method for preparing a polyurethane foam which comprises reacting an organic polyisocyanate and a polyol in the presence of a blowing agent, a cell stabilizer and a catalyst composition consisting essentially of a compound having the following formula I:

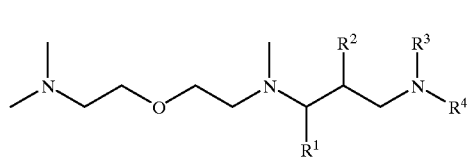

where $R^1$ is hydrogen or a C1–C4 linear or branched alkyl, hydroxyalkyl or aminoalkyl group;

$R^2$ is hydrogen or a C1–C6 linear or branched alkyl, hydroxyalkyl or aminoalkyl group; and $R^3$ and $R^4$ are independently hydrogen or a C1–C10 linear or branched alkyl, hydroxyalkyl or aminoalkyl group which may contain ether functionality.

7 Claims, No Drawings

AMINOPROPYLBIS(AMINOETHYL) ETHER COMPOSITIONS FOR THE PRODUCTION OF POLYURETHANES

This application is a division of Ser. No. 08/534,751 filed Sep. 27, 1995 now U.S. Pat. No. 5,874,483.

TECHNICAL FIELD OF THE INVENTION

The present invention relates to the use of aminopropylbis (aminoethyl) ether derivatives as catalysts for producing polyurethanes.

BACKGROUND OF THE INVENTION

Polyurethane foams are widely known and used in automotive, housing and other industries. Such foams are produced by reaction of a polyisocyanate with a polyol in the presence of various additives. One such additive is a chlorofluorocarbon (CFC) blowing agent which vaporizes as a result of the reaction exotherm, causing the polymerizing mass to form a foam. The discovery that CFC's deplete ozone in the stratosphere has resulted in mandates diminishing CFC use. Production of water-blown foams, in which blowing is performed with $CO_2$ generated by the reaction of water with the polyisocyanate, has therefore become increasingly important. Tertiary amine catalysts are typically used to accelerate blowing (reaction of water with isocyanate to generate $CO_2$) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction too selectively, much of the $CO_2$ will be evolved before sufficient reaction of isocyanate with polyol has occurred, and the $CO_2$ will bubble out of the formulation, resulting in collapse of the foam. A foam of poor quality will be produced. In contrast, if a catalyst too strongly promotes the gelling reaction, a substantial portion of the $CO_2$ will be evolved after a significant degree of polymerization has occurred. Again, a poor quality foam, this time characterized by high density, broken or poorly defined cells, or other undesirable features, will be produced.

Tertiary amine catalysts generally are malodorous and offensive and many have high volatility due to low molecular weight. Release of tertiary amines during foam processing may present significant safety and toxicity problems, and release of residual amines from consumer products is generally undesirable.

Amine catalysts which contain active hydrogen functionality (e.g., —OH, —$NH_2$, and —NHR) often have limited volatility and low odor when compared to related structures which lack this functionality. Furthermore, catalysts which contain active hydrogen functionality chemically bond into the urethane during the reaction and are not released from the finished product. Catalyst structures which embody this concept are typically of low to moderate activity and promote both the blowing (water-isocyanate) and the gelling (polyol-isocyanate) reactions to varying extents.

Secondary alcohols are preferred in the structures because these catalysts exhibit a desirable balance between their promotion of the active hydrogen-isocyanate reactions and their own reactivity with isocyanates. In contrast, catalysts which contain primary alcohols react rapidly with isocyanates and thus high use levels are required. Catalysts which contain tertiary alcohols react slowly with isocyanates, but the urethanes of tertiary alcohols which are formed have poor thermal stability. These urethanes may degrade and release the catalyst at temperatures substantially below the decomposition temperature of the foam itself. The free amine could then accelerate foam decomposition.

Catalysts containing active hydrogen functionality of the type —$NH_2$ and —NHR are less well known.

Catalysts which strongly promote the water-isocyanate (blowing) reaction include tertiary amine structures based on the diethylenetriamine skeleton, in particular pentamethyidiethylenetriamine, and the β-(N,N-dimethylamino)alkyl ethers, in particular bis(N,N-dimethylaminoethyl) ether. Low odor, reactive catalysts structurally related to bis(N,N-dimethylaminoethyl) ether are described in U.S. Pat. No. 4,338,408 and 4,433,170. Texacat® ZF-10 catalyst, 2-[N-(dimethylaminoethoxyethyl)-N-methylamino]ethanol, is an effective blowing catalyst, albeit less effective than bis(N, N-dimethylaminoethyl) ether.

SUMMARY OF THE INVENTION

The present invention provides a composition for catalyzing the trimerization of an isocyanate and the reaction between an isocyanate and a compound containing a reactive hydrogen, e.g., the blowing reaction and the gelling (urethane) reaction for making polyurethane. The catalyst composition consists essentially of a compound having the following formula I:

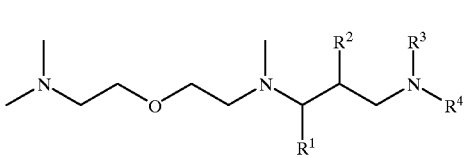

where $R^1$ is hydrogen or a C1–C4 linear or branched alkyl, hydroxyalkyl or aminoalkyl group;

$R^2$ is hydrogen or a C1–C6 linear or branched alkyl, hydroxyalkyl or aminoalkyl group; and $R^3$ and $R^4$ are independently hydrogen or a C1–C10 linear or branched alkyl, hydroxyalkyl or aminoalkyl group which optionally contains ether functionality.

It is to be understood that each "—" on a nitrogen atom represents a methyl group, e.g., N—represents N—Me.

The advantage of these catalysts are their combination of low odor and high activity. Additionally, compounds of this type where $R^3$ and/or $R^4$ are hydrogen contain amine functionality which is reactive with isocyanate and will chemically bond into the urethane during the reaction so that the compound is not released from the finished product. That such compounds have good catalytic activity in the production of a polyurethane is surprising, since the prior art suggests that they will react at time of mixing and be incorporated into the polymer matrix early in the polyurethane process thus limiting their mobility.

DETAILED DESCRIPTION OF THE INVENTION

The catalyst compositions according to the invention can catalyze (1) the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylene diisocyanate, toluene diisocyanate ("TDI") and 4,4'-diphenyl-methane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A general polyurethane flexible foam formulation having a 1–3 lb/ft$^3$ (16–48 kg/m$^3$) density (e.g., automotive seating) containing a gelling catalyst such as triethylenediamine (TEDA) and a blowing catalyst such as the catalyst composition according to the invention would comprise the following components in parts by weight (pbw):

| Flexible Foam Formulation | pbw |
|---|---|
| Polyol | 20–100 |
| Polymer Polyol | 80–0 |
| Silicone Surfactant | 1–2.5 |
| Blowing Agent | 2–4.5 |
| Crosslinker | 0.5–2 |
| Catalyst | 0.25–2 |
| Isocyanate Index | 70–115 |

The blowing catalyst composition composing part of the Catalyst in the above foam formulation is a compound represented by formula I:

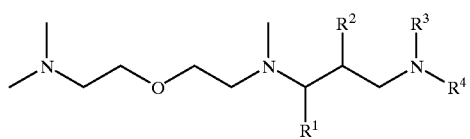

where

R$^1$ is hydrogen or a C1–C4 linear or branched alkyl, hydroxyalkyl or aminoalkyl group;

R$^2$ is hydrogen or a C1–C6 linear or branched alkyl, hydroxyalkyl or aminoalkyl group; and R$^3$ and R$^4$ are independently hydrogen or a C1–C10 linear or branched alkyl, hydroxyalkyl or aminoalkyl group which may contain ether functionality.

Alkyl groups would include, for example, methyl, ethyl, butyl, hexyl, ethylhexyl, decyl and the like; hydroxyalkyl groups would, for example, hydroxymethyl (not applicable for R$^3$ or R$^4$), hydroxyethyl, hydroxyethylhexyl, and the like; aminoalkyl groups would include, for example, aminomethyl (not applicable for R$^3$ or R$^4$), N-methylaminomethyl, N,N-dimethylaminomethyl, aminoethyl, N-methylaminoethyl, N,N-dimethyl-aminoethyl, aminoethylhexyl, N-methylaminoethylhexyl, N,N-dimethylaminoethylhexyl, N,N,N'-trimethylaminoethoxyethylaminopropyl and the like.

Exemplary of suitable catalysts are compounds of the following structures Ia to Ii:

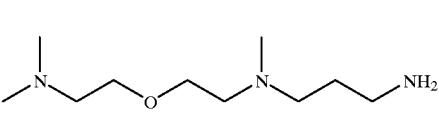

The preferred catalyst composition is N,N,N'-trimethyl-N'-3-aminopropyl-bis(aminoethyl) ether (Ia).

The preferred route to catalyst compositions of this type would be a three step process involving the Michael addition of bisaminoethyl ether II to less than stoichiometric amounts of acrylonitrile or a substituted acrylonitrile III to afford Michael adduct IV, selective permethylation of Michael adduct IV to nitrile V and conversion of nitrile V to catalyst composition I via hydrogenation, reductive amination with a primary or secondary amine, or reductive dimerization.

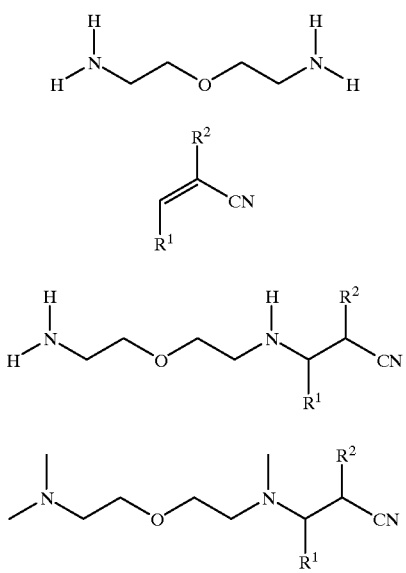

Another preferred route to catalyst compositions of structure I would be the methylation of bisaminoethyl ether II with a slight substoichiometric amount of formaldehyde and hydrogen to afford a bisaminoethyl ether VI in combination with other methylated products. Bisaminoethyl ether VI would then be reacted with acrylonitrile or a substituted acrylonitrile III to afford nitrile V which would be converted to the catalyst composition I via hydrogenation, reductive amination with a primary or secondary amine, or reductive dimerization.

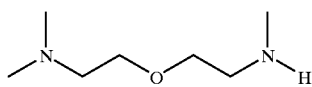

VI

Alternatively, catalyst compositions of this type can be prepared from dimethylaminoethoxyethanol in a three step procedure. Step one is the amination of dimethylaminoethoxyethanol with methylamine to afford the bisaminoethyl ether VI. Step two is the Michael addition of VI to acrylonitrile or substituted acrylonitrile III to afford nitrile V. Nitrile V is then converted to I via hydrogenation, reductive amination with a primary or secondary amine, or reductive dimerization.

A catalytically effective amount of the catalyst composition is used in the polyurethane formulation. More specifically, suitable amounts of the catalyst composition may range from about 0.01 to 10 parts per 100 parts polyol (phpp), preferably 0.1 to 0.5 phpp, in the polyurethane formulation.

The catalyst composition may be used in combination with other tertiary amine, organotin and carboxylate urethane catalysts well known in the urethane art.

EXAMPLE 1

N,N,N'-Trimethylbis(aminoethyl) ether (TMAEE)

A 2-liter stainless steel autoclave was charged with 499.4 g (3.75 moles) of dimethylaminoethoxyethanol (DMAEE) and 37.9 g of Cu/ZnO/Al$_2$O$_3$ catalyst. After purging the reactor with N$_2$ and H$_2$, the catalyst was reduced in situ under 56 bar of H$_2$ at a temperature of 195° C. for 9 hr. The reactor was then cooled to 25° C. and vented to ambient pressure. From a sample cylinder connected to a port in the reactor head, 177 g (5.7 moles) of monomethylamine (MMA) was charged using a 6.5 bar N$_2$ head to assist in the transfer. After resealing the reactor and pressurizing it to 14.8 bar with H$_2$, the reactor was heated to 195° C. and kept at that temperature for 23.3 hr. The reactor was then cooled to 25° C. and 600.1 g of reaction product was recovered after filtration to remove the catalyst particles. Gas chromatographic analysis showed that 65% of the DMAEE was converted and the reaction product contained:

| Reaction Product | wt % |
|---|---|
| N,N,N'-trimethylbis(aminoethyl)ether | 38.2 |
| Dimethylaminoethoxyethanol | 29.4 |
| Water | 7.1 |
| Monomethyl amine | 5.8 |
| Other amines | 19.5 |

The reaction product was heated under vacuum to remove the low boiling components. A short path distillation was then done to remove heavies and any traces of Cu/ZnO/Al$_2$O$_3$ catalyst. The overhead product from the short-path distillation (325.6 g) contained:

| Overhead Product from Short-Path Distillation | wt % |
|---|---|
| N,N,N'-trimethylbis(aminoethyl)ether | 57.2 |
| Dimethylaminoethoxyethanol | 37.4 |
| Other amines | 5.4 |

This overhead product was used in the preparation of TMCEAEE in Example 2 below.

EXAMPLE 2

N,N,N'-Trimethyl-N'-2-cyanoethylbis(aminoethyl) ether (TMCEAEE)

Into a three necked round bottom flask equipped with a teflon coated magnetic stir bar, reflux condenser, pressure equalizing dropping funnel, and thermometer was placed 325 g of the mixture from Example 1 (1.27 moles of contained N,N,N'-trimethylbis(aminoethyl) ether). The mixture was heated to 55° C. and 71 g (1.34 moles) of acrylonitrile was added over a period of two hours. The reaction was allowed to proceed an additional five hours until less than 1% of unreacted N,N',N'-trimethylbis(aminoethyl) ether remained. The crude product was used without purification in Example 3.

EXAMPLE 3

N,N,N'-Trimethyl-N'-3-aminopropylbis(aminoethyl) ether (TMAPAEE)

Into a 1 liter stainless steel autoclave was placed 20 g of chromium promoted sponge nickel and 150 g of 28% aqueous ammonium hydroxide. The reaction vessel was sealed and purged with nitrogen then hydrogen. The contents of the reaction vessel were then heated to 90° C. and the pressure adjusted to 82 bars with hydrogen. Then 426 g of the mixture from Example 2 was pumped into the reaction vessel over a period of 3.5 hours. The reaction was allowed to proceed an additional 50 minutes during which time less than 1% of the total hydrogen used was consumed. The hydrogen pressure was maintained at 82 bars throughout the reaction by admission of hydrogen from a 3.79 liter ballast on demand from a dome regulator. The reaction vessel was then cooled and vented and the contents filtered through a 0.45 micron fritted stainless steel filter.

The crude product was placed into a one liter flask and distilled through a 91.4 cm×2.54 cm i.d. packed column to afford 184.5 g of 97.5% pure product collected at 124 to 133° C. at 13 millibar. The product is N,N,N'-trimethyl-N'-3-aminopropylbis(aminoethyl) ether and corresponds to structure Ia.

EXAMPLE 4

2-(1-Hydroxyethyl)acrylonitrile (HEAN)

Into a 500 ml three necked round-bottom flask equipped with a Teflon coated magnetic stir bar and pressure equalizing dropping funnel was placed 20.1 g of 1,4-diazabicyclo[2.2.2]octane and 88 g (2.0 moles) of acetaldehyde. The flask was immersed in an ice bath and 106 g (2.0 moles) of acrylonitrile was added dropwise while stirring over a period of 2.5 hours.

The mixture was allowed to stand for five days and was then taken up in 200 ml of ethyl ether and the 1,4-diazabicyclo[2.2.2]octane neutralized by the addition of 54 g of 22% phosphoric acid. The phases were separated and the organic phase was concentrated in vacuo. This material was used in the following example without further purification.

EXAMPLE 5

N,N,N'-Trimethyl-N'-2-cyano-3-hydroxybutyl-bis(aminoethyl)ether (TMCHBAEE)

Into a 250 ml three necked round bottom flask equipped with a Teflon coated magnetic stir bar was placed 141 g of an overhead product mixture prepared according to the procedure given in Example 1 (0.26 moles of contained TMAEE) and 56 g of the product from Example 4 (0.42 moles of contained HEAN). The mixture was allowed to stir for one week. The crude product was used without further purification in Example 6.

EXAMPLE 6

N,N,N'-Trimethyl-N'-(2-aminomethyl-3-hydroxybutyl)-bis(aminoethyl) ether (TMAMHBAEE)

Into a 1 liter stainless steel autoclave was placed 10 g of chromium promoted sponge nickel and 200 g of 14% aqueous ammonium hydroxide. The reaction vessel was sealed and purged with nitrogen then hydrogen. The contents of the reaction vessel were heated to 90° C. and the pressure adjusted to 82 bars with hydrogen. Then 192 g of the mixture from Example 5 was pumped into the reaction vessel in 5 hours and 40 minutes. The reaction was allowed to proceed an additional 20 minutes. The reaction vessel was then cooled and vented and the contents filtered through a fritted stainless steel filter. Water was removed from the crude product in vacuo and the DMAEE and other lights were removed by distillation through a spinning band distillation column at 3 millibar. The still bottoms (56.8 g) were then flashed through a short path distillation column at 5.3 millibar and 172–185° C. to afford 43.3 g of TMAMHBAEE as a pale yellow oil of 98% purity by GC/FID. $^{13}$C and $^1$H nmr spectra verified the structure and the presence of the two diastereoisomers in an approximate 2:1 ratio.

The products may also be identified as N,N,N'-trimethyl-N'-3-amino-2-(1-hydroxyethyl)propylbis(aminoethyl) ether and correspond to structure Ic.

EXAMPLE 7

In Runs 1–3 of this example a polyurethane foam was prepared in a conventional manner. The polyurethane formulation in parts by weight was:

| COMPONENT | PARTS |
| --- | --- |
| E-648 | 60 |
| E-519 | 40 |
| DC-5043 | 1.5 |
| Diethanolamine | 1.49 |
| Water | 3.5 |
| TDI 80 | 105 Index |

E-648—a conventional, ethylene oxide tipped polyether polyol marketed by Arco Chemical Company.
E-519—a styrene-acrylonitrile copolymer filled polyether polyol marketed by Arco Chemical Company.
DABCO® DC-5043—silicone surfactant marketed by Air Products and Chemicals, Inc.
TDI 80—a mixture of 80 wt % 2,4-TDI and 20 wt % 2,6-TDI.

For each foam of Run 1–3, the catalyst (Table 1) was added to 202 g of the above premix in a 32 oz (951 mL) paper cup and the formulation was mixed for 10 sec at 12000 RPM using an overhead stirrer fitted with a 2 in (5.1 cm) diameter stirring paddle. Sufficient TDI 80 (see Table 1) was added to make a 105 index foam [index=(mole NCO/mole active hydrogen)×100] and the formulation was mixed well for 5 sec at 12000 RPM using the same stirrer. The 32 oz cup was dropped through a hole in the bottom of a 128 oz (3804 mL) paper cup on a stand. The hole was sized to catch the lip of the 32 oz cup. The total volume of the foam container was 160 oz (4755 mL). Foams approximated this volume at the end of the foam forming process. Maximum foam height was recorded.

TABLE 1

| | Catalysts | | | | | |
| --- | --- | --- | --- | --- | --- | --- |
| Run | DABCO 33-LV ®* | DABCO ® BL-11** | EX 3 Catalyst | EX 6 Catalyst | TDI | Foam hgt |
| 1 | 0.48 g | 0.20 g | | | 85.7 g | 403 mm |
| 2 | 0.49 g | | 0.16 g | | 85.5 g | 411 mm |
| 3 | 0.48 g | | | 0.19 g | 85.8 g | 403 mm |

*a 33 wt % solution of triethylenediamine in dipropylene glycol marketed by Air Products and Chemicals, Inc.
**a 70 wt % solution of bis(N,N-dimethylaminoethyl) ether in dipropylene glycol marketed by Air Products and Chemicals, Inc.

The data in Table 1 shows the suitability of the catalysts of Examples 3 and 6 as blowing catalysts substitutes for the industry standard bis(N,N-dimethylaminoethyl) ether.

STATEMENT OF INDUSTRIAL APPLICATION

The catalysts of the present invention are useful in the production of polyurethane foams.

We claim:

1. A catalyst composition consisting essentially of a N,N,N'-trimethyl- compound of formula I:

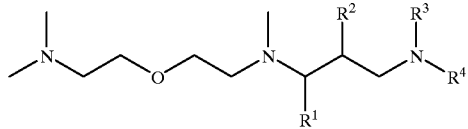

where $R^1$ is hydrogen or a C1–C4 linear or branched alkyl, hydroxyalkyl or aminoalkyl group;

$R^2$ is hydrogen or a C1–C6 linear or branched alkyl, hydroxyalkyl or aminoalkyl group; and $R^3$ and $R^4$ are independently hydrogen or a C1–C10 linear or branched alkyl, hydroxyalkyl or aminoalkyl group which may contain ether functionality.

2. The catalyst composition of claim 1 in which the compound of formula I is N,N,N'-trimethyl-N'-3-aminopropylbis(aminoethyl) ether.

3. The catalyst composition of claim 1 in which the compound of formula I is N,N,N'-trimethyl-N'-3-amino-2-(1-hydroxyethyl)propylbis(aminoethyl) ether.

4. The catalyst composition of claim 1 in which the catalyst composition also contains a tertiary amine, organotin and/or carboxylate urethane catalyst.

5. The catalyst composition of claim 2 in which the catalyst composition also contains a tertiary amine, organotin and/or carboxylate urethane catalyst.

6. The catalyst composition of claim 3 in which the catalyst composition also contains a tertiary amine, organotin and/or carboxylate urethane catalyst.

7. The catalyst composition of claim 1 in which $R^1$ is hydrogen, —$CH_2NH_2$ or —$CH_2N(CH_3)_2$;

$R^2$ is hydrogen or —$CH(OH)CH_3$;

$R^3$ is hydrogen, $CH_3$ or —$(CH_2)_3N(CH_3)(CH_2)_2O(CH_2)_2N(CH_3)_2$; and $R^4$ is hydrogen, $CH_3$ or —$(CH_2)_3N(CH_3)(CH_2)_2O(CH_2)_2N(CH_3)_2$.

* * * * *